United States Patent
Seo et al.

(10) Patent No.: US 10,840,493 B2
(45) Date of Patent: Nov. 17, 2020

(54) SEPARATOR FOR RECHARGEABLE BATTERY AND RECHARGEABLE LITHIUM BATTERY INCLUDING THE SAME

(71) Applicant: Samsung SDI Co., Ltd., Yongin-si (KR)

(72) Inventors: Dongwan Seo, Suwon-si (KR); Hyeonsun Choi, Suwon-si (KR); Jinkyu Park, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 142 days.

(21) Appl. No.: 15/982,380

(22) Filed: May 17, 2018

(65) Prior Publication Data

US 2018/0337381 A1    Nov. 22, 2018

(30) Foreign Application Priority Data

May 17, 2017   (KR) .................. 10-2017-0061283

(51) Int. Cl.
*H01M 2/16*    (2006.01)
*C09D 7/61*    (2018.01)
(Continued)

(52) U.S. Cl.
CPC ......... *H01M 2/1626* (2013.01); *C08J 7/0427* (2020.01); *C08K 3/22* (2013.01); *C09D 5/18* (2013.01); *C09D 7/61* (2018.01); *C09D 133/20* (2013.01); *H01M 2/145* (2013.01); *H01M 2/166* (2013.01); *H01M 2/1653* (2013.01); *H01M 2/1666* (2013.01); *H01M 2/1686* (2013.01); *H01M 4/131* (2013.01); *H01M 4/133* (2013.01); *H01M 4/505* (2013.01); *H01M 4/525* (2013.01); *H01M 4/623* (2013.01); *H01M 4/624* (2013.01);
(Continued)

(58) Field of Classification Search
None
See application file for complete search history.

(56) References Cited

U.S. PATENT DOCUMENTS

| 4,574,110 A | 3/1986 | Asano et al. |
| 9,293,753 B2 | 3/2016 | Toyoda |

(Continued)

FOREIGN PATENT DOCUMENTS

| CN | 1328102 A | 12/2001 |
| CN | 101641808 A | 2/2010 |

(Continued)

OTHER PUBLICATIONS

U.S. Appl. No. 15/596,258, filed May 16, 2017.
(Continued)

*Primary Examiner* — Wyatt P McConnell
(74) *Attorney, Agent, or Firm* — Lee IP Law, PC (57) ABSTRACT

Disclosed are a separator for a rechargeable battery including a porous substrate and a heat resistance layer on at least one surface of the porous substrate, wherein the heat resistance layer includes an acryl-based heat resistance binder, a water-soluble binder, and a filler, and the acryl-based heat resistance binder includes a structural unit derived from (meth)acrylate or (meth)acrylic acid, a cyano group-containing structural unit and a sulfonate group-containing structural unit, and a rechargeable lithium battery including the same.

14 Claims, 1 Drawing Sheet

(51) Int. Cl.
*C08J 7/04* (2020.01)
*C08K 3/22* (2006.01)
*C09D 5/18* (2006.01)
*C09D 133/20* (2006.01)
*H01M 10/0525* (2010.01)
*H01M 2/14* (2006.01)
*H01M 4/131* (2010.01)
*H01M 4/133* (2010.01)
*H01M 4/505* (2010.01)
*H01M 4/525* (2010.01)
*H01M 4/62* (2006.01)
*H01M 4/66* (2006.01)
*H01M 10/052* (2010.01)
*H01M 4/02* (2006.01)

(52) U.S. Cl.
CPC ....... *H01M 4/661* (2013.01); *H01M 10/0525* (2013.01); *C08J 2323/06* (2013.01); *C08J 2433/20* (2013.01); *C08K 2003/2227* (2013.01); *H01M 10/052* (2013.01); *H01M 2004/027* (2013.01); *H01M 2004/028* (2013.01)

(56) References Cited

U.S. PATENT DOCUMENTS

| | | |
|---|---|---|
| 10,205,147 B2 | 2/2019 | Park et al. |
| 2011/0027642 A1 | 2/2011 | Lee et al. |
| 2011/0081601 A1 | 4/2011 | Weber et al. |
| 2013/0017429 A1 | 1/2013 | Ha et al. |
| 2013/0171499 A1 | 7/2013 | Yang et al. |
| 2013/0252066 A1 | 9/2013 | Yeou et al. |
| 2013/0302661 A1 | 11/2013 | Kim et al. |
| 2014/0030578 A1 | 1/2014 | Hoshiba et al. |
| 2014/0045033 A1 | 2/2014 | Zhang et al. |
| 2014/0107275 A1 | 4/2014 | Uemura |
| 2014/0186680 A1* | 7/2014 | Kim ............... H01M 2/1646 429/144 |
| 2015/0140402 A1 | 5/2015 | Kim et al. |
| 2016/0013465 A1* | 1/2016 | Akiike ............ H01M 2/1653 429/144 |
| 2016/0164059 A1 | 6/2016 | Hong et al. |
| 2016/0233475 A1 | 8/2016 | Son et al. |
| 2017/0133654 A1 | 5/2017 | Cho et al. |
| 2017/0338461 A1 | 11/2017 | Seo et al. |

FOREIGN PATENT DOCUMENTS

| | | |
|---|---|---|
| CN | 101946344 A | 1/2011 |
| CN | 102015083 A | 4/2011 |
| CN | 102640329 A | 8/2012 |
| CN | 103325975 A | 9/2013 |
| CN | 103390740 A | 11/2013 |
| CN | 104521028 A | 4/2015 |
| CN | 104521031 A | 4/2015 |
| CN | 105018001 A | 11/2015 |
| CN | 105027325 A | 11/2015 |
| CN | 105637677 A | 6/2016 |
| JP | 02-063788 | 3/1990 |
| JP | 06-172725 | 6/1994 |
| JP | 5323590 B2 | 10/2013 |
| JP | 2014-149935 A | 8/2014 |
| JP | 5601472 B2 | 10/2014 |
| JP | 2015-88253 | 5/2015 |
| JP | 2015-162312 A | 9/2015 |
| JP | 2016-216550 | 12/2016 |
| KR | 10-2012-0097238 | 9/2012 |
| KR | 10-1187767 B1 | 9/2012 |
| KR | 10-1247248 | 3/2013 |
| KR | 10-2013-0035215 | 4/2013 |
| KR | 10-1301595 B1 | 8/2013 |
| KR | 10-2013-0107550 A | 10/2013 |
| KR | 10-2014-0003404 | 1/2014 |
| KR | 10-2014-0004156 | 1/2014 |
| KR | 10-2014-0044757 | 4/2014 |
| KR | 10-1470696 B1 | 12/2014 |
| KR | 10-2015-0042216 A | 4/2015 |
| KR | 10-2015-0043703 | 4/2015 |
| KR | 10-2015-0057481 | 5/2015 |
| KR | 10-1529758 | 6/2015 |
| KR | 10-2015-0106811 A | 9/2015 |
| KR | 10-1551757 B1 | 9/2015 |
| KR | 10-2016-0051199 | 5/2016 |
| KR | 10-2016-0069431 A | 6/2016 |
| WO | WO 2012/011555 A1 | 1/2012 |
| WO | WO 2012/029805 A1 | 3/2012 |
| WO | WO 2014/148577 A1 | 9/2014 |
| WO | WO 2013/125645 A1 | 7/2015 |

OTHER PUBLICATIONS

Chinese Search Report dated Oct. 16, 2019 and Office action dated Oct. 24, 2019 for corresponding Chinese Patent Application No. 201710347234.7.
U.S. Appl. No. 16/603,649, filed Oct. 8, 2019.
International Search Report for PCT/KR2018/005568 filed on May 15, 2018.
International Search Report of PCT/KR2018/005568 dated Aug. 24, 2018.
Office Action Received in U.S. Appl. No. 15/596,258 dated Mar. 18, 2019.
Office action received in U.S. Appl. No. 15/596,258 dated Oct. 3, 2019.
Office action received in U.S. Appl. No. 15/596,258 dated Jan. 10, 2020.
U.S. Office action dated Jul. 10, 2020, in U.S. Appl. No. 15/596,258.
Chinese Office action dated Jun. 19, 2020.
U.S. Office action dated Sep. 28, 2020, in U.S. Appl. No. 15/596,258.
Chinese Office action dated Sep. 27, 2020 and Search Report dated Sep. 16, 2020.

* cited by examiner

SEPARATOR FOR RECHARGEABLE BATTERY AND RECHARGEABLE LITHIUM BATTERY INCLUDING THE SAME

CROSS-REFERENCE TO RELATED APPLICATION

This application claims priority to and the benefit of Korean Patent Application No. 10-2017-0061283 filed in the Korean Intellectual Property Office on May 17, 2017, the entire contents of which are incorporated herein by reference.

BACKGROUND OF THE INVENTION

1. Field

A separator for a rechargeable battery and a rechargeable lithium battery including the same are disclosed.

2. Description of the Related Art

A separator for an electrochemical battery is an intermediate film that separates a positive electrode and a negative electrode in a battery, and maintains ion conductivity continuously to enable charge and discharge of a battery. When a battery is exposed to a high temperature environment due to abnormal behavior, a separator may be mechanically shrinks or is damaged due to melting characteristics at a low temperature. Herein, the positive and negative electrodes contact each other and may cause an explosion of the battery. In order to overcome this problem, technology of suppressing shrinkage of a separator and ensuring stability is required.

For example, a method of increasing thermal resistance of the separator by coating the separator with a mixture of inorganic particles having a large thermal resistance and an organic binder having adherence is well known. However, this conventional method may not sufficiently secure desired adherence and not uniformly applied to variously-sized separators. Accordingly, a separator having high heat resistance and excellent adherence needs to be developed.

SUMMARY OF THE INVENTION

A separator for a rechargeable battery having high heat resistance and strong adherence is provided and a rechargeable lithium battery has improved heat resistance, stability, cycle-life characteristics, rate capability, oxidation resistance, and the like.

In an embodiment, a separator for a rechargeable battery includes a porous substrate and a heat resistance layer on at least one surface of the porous substrate, wherein the heat resistance layer includes an acryl-based heat resistance binder, a water-soluble binder, and a filler, and the acryl-based heat resistance binder includes a structural unit derived from (meth)acrylate or (meth)acrylic acid, a cyano group-containing structural unit, and a sulfonate group-containing structural unit.

In another embodiment, a rechargeable lithium battery includes a positive electrode, a negative electrode, and the separator for a rechargeable battery disposed between the positive electrode and the negative electrode.

The separator for a rechargeable battery according to an embodiment has improved heat resistance and adherence, and thus a rechargeable lithium battery including the same has improved heat resistance, stability, cycle-life characteristics, rate capability, and oxidation resistance.

DETAILED DESCRIPTION OF THE EMBODIMENTS

Hereinafter, embodiments of the present invention are described in detail. However, these embodiments are exemplary, the present invention is not limited thereto and the present invention is defined by the scope of claims.

Hereinafter, as used herein, when a definition is not otherwise provided "substituted" refers to replacement of hydrogen of a compound by a substituent selected from a C1 to C30 alkyl group, a C2 to C30 alkenyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (F, Cl, Br or I), a hydroxy group (—OH), a nitro group (—NO$_2$), a cyano group (—CN), an amino group (—NRR') (wherein, R and R' are independently hydrogen or a C1 to C6 alkyl group), a sulfobetaine group ((—RR'N$^+$(CH$_2$)$_n$SO$_3^-$), a carboxyl betaine group (—RR'N$^+$(CH$_2$)$_n$COO$^-$) wherein R and R' are independently a C1 to C20 alkyl group), an azido group (—N$_3$), an amidino group (—C(=NH)NH$_2$), a hydrazino group (—NHNH$_2$), a hydrazono group (=N(NH$_2$), a carbamoyl group (—C(O)NH$_2$), a thiol group (—SH), an acyl group (—C(=O)R, wherein R is hydrogen, a C1 to C6 alkyl group, a C1 to C6 alkoxy group, or a C6 to C12 aryl group), a carboxyl group (—COOH) or a salt thereof (—C(=O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), and a combination thereof.

Hereinafter, a C1 to C3 alkyl group may be a methyl group, an ethyl group, or a propyl group. A C1 to C10 alkylene group may be for example a C1 to C6 alkylene group, a C1 to C5 alkylene group, or a C1 to C3 alkylene group, and may be for example a methylene group, an ethylene group, or a propylene group. A C3 to C20 cycloalkylene group may be for example a C3 to C10 cycloalkylene group, or a C5 to C10 alkylene group, and may be for example a cyclohexylene group. A C6 to C20 arylene group may be for example a C6 to C10 arylene group and may be for example a phenylene group. A C3 to C20 heterocyclic group may be for example a C3 to C10 heterocyclic group and may be for example a pyridine group.

Hereinafter, "hetero" refers to one including at least one heteroatom selected from N, O, S, Si, and P.

Hereinafter, "combination thereof" refers to a mixture, a copolymer, a blend, an alloy, a composite, a reaction product of components.

In addition, in chemical formula, "*" refers to a point of attachment to an atom, a group, or a unit that may be the same or different.

Hereinafter, "alkali metal" refers to an element of Group 1 of Periodic Table 1, lithium, sodium, potassium, rubidium, cesium, or francium and may be present in a cation state or neutral state.

Figure 1:
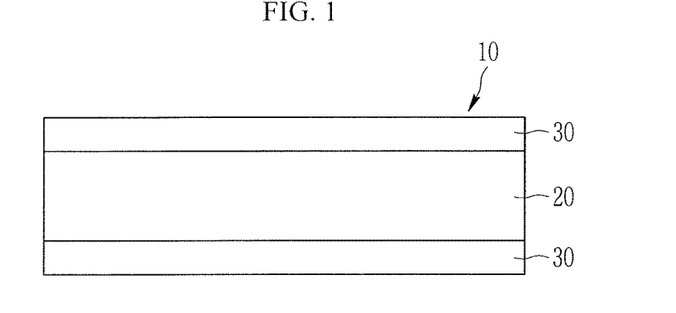
FIG. 1 is a cross-sectional view showing a separator for a rechargeable battery according to an embodiment.

Hereinafter, a separator for a rechargeable battery according to an embodiment is described. FIG. 1 is a view showing a separator for a rechargeable battery according to an embodiment. Referring to FIG. 1, a separator 10 for a rechargeable battery according to an embodiment includes a porous substrate 20 and a heat resistance layer 30 disposed on one surface or both surfaces of the porous substrate 20.

The porous substrate 20 may have a plurality of pore and may generally be a porous substrate used in an electrochemical device. Non-limiting examples of the porous substrate 20 may be a polymer film formed of a polymer, or a copolymer or a mixture of two or more selected from polyolefin such as polyethylene, polypropylene, and the like, a polyester such as polyethylene terephthalate, polybutylene terephthalate, and the like, polyacetal, polyamide, polyimide, polycarbonate, polyetheretherketone, polyaryletherketone, polyetherimide, polyamideimide, polybenzimidazole, polyether sulfone, polyphenylene oxide, a cyclic olefin copolymer, polyphenylene sulfide, polyethylene naphthalate, a glass fiber, Teflon, and polytetrafluoroethylene.

The porous substrate 20 may be for example a polyolefin-based substrate, and the polyolefin-based substrate may improve has safety of a battery due to its improved shutdown function. The polyolefin-based substrate may be for example selected from a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include a non-olefin resin in addition to an olefin resin or a copolymer of olefin and a non-olefin monomer.

The porous substrate 20 may have a thickness of about 1 μm to about 40 μm, for example about 1 μm to about 30 μm, about 1 μm to about 20 μm, about 5 μm to about 15 μm, or about 10 μm to about 15 μm.

The heat resistance layer 30 includes an acryl-based heat resistance binder, a water-soluble binder, and a filler.

The acryl-based heat resistance binder is present between the filler particles in a film form as a high heat resistance binder.

The acryl-based heat resistance binder includes a structural unit derived from (meth)acrylate or (meth)acrylic acid, a cyano group-containing structural unit, and a sulfonate group-containing structural unit. The acryl-based heat resistance binder may play a role of fixing the filler on the porous substrate 20, and may simultaneously provide an adhesion force to adhere the heat resistance layer 30 on the porous substrate 20 and the electrode, and may contribute improvement of heat resistance, air permeability, and oxidation resistance of the separator 10.

In the structural unit derived from (meth)acrylate or (meth)acrylic acid, the (meth)acrylate may be a conjugate base of a (meth)acrylic acid, a (meth)acrylate salt, or a derivative thereof. The structural unit derived from (meth) acrylate or (meth)acrylic acid may be for example represented by Chemical Formula 1, Chemical Formula 2, Chemical Formula 3, or a combination thereof.

[Chemical Formula 1]

[Chemical Formula 2]

[Chemical Formula 3]

In Chemical Formula 1 to Chemical Formula 3,
$R^1$, $R^2$, and $R^3$ are independently hydrogen or a methyl group,
in Chemical Formula 2,
M is an alkali metal.
The alkali metal may be for example lithium, sodium, potassium, rubidium, or cesium.

The structural unit derived from (meth)acrylate or (meth) acrylic acid may be included in an amount of about 10 mol % to about 70 mol %, for example about 20 mol % to about 60 mol %, for example about 30 mol % to about 60 mol %, for example about 40 mol % to about 55 mol % based on a total amount of the acryl-based heat resistance binder. When the structural unit derived from (meth)acrylate or (meth) acrylic acid is included within the ranges, the acryl-based heat resistance binder and the separator 10 including the same may exhibit excellent adherence, heat resistance, air permeability, and oxidation resistance.

For example, the structural unit derived from (meth) acrylate or (meth)acrylic acid may include the structural unit derived from Chemical Formula 2 and the structural unit derived from Chemical Formula 3, and in this case, the structural unit derived from Chemical Formula 2 and the structural unit derived from Chemical Formula 3 may be included in a mole ratio of about 10:1 to about 1:2, or about 10:1 to about 1:1, or about 5:1 to about 1:1.

The cyano group-containing structural unit may be for example represented by Chemical Formula 4.

[Chemical Formula 4]

In Chemical Formula 4,
$R^4$ is hydrogen or a C1 to C3 alkyl group,
$L^1$ is —C(=O)—, —C(=O)O—, —OC(=O)—, —O—, or —C(=O)NH—,
x is an integer ranging from 0 to 2,
$L^2$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, and y is an integer ranging from 0 to 2.

The cyano group-containing structural unit may be for example a structural unit derived from (meth)acrylonitrile, alkenenitrile, cyanoalkyl(meth)acrylate, or 2-(vinyloxy)alkane nitrile. Herein, the alkene may be C1 to C20 alkene, C1 to C10 alkene, or C1 to C6 alkene, the alkyl may be C1 to C20 alkyl, C1 to C10 alkyl, or C1 to C6 alkyl, and the alkane may be C1 to C20 alkane, C1 to C10 alkane, or C1 to C6 alkane.

The alkene nitrile may be for example allyl cyanide, 4-pentene nitrile, 3-pentene nitrile, 2-pentene nitrile, or 5-hexene nitrile, and the like. The cyanoalkyl(meth)acrylate may be for example cyanomethyl(meth)acrylate, cyanoethyl (meth)acrylate, cyanopropyl(meth)acrylate, or cyanooctyl (meth)acrylate. The 2-(vinyloxy)alkane nitrile may be for example 2-(vinyloxy)ethane nitrile, or 2-(vinyloxy)propane nitrile.

The cyano group-containing structural unit may be included in an amount of about 30 mol % to about 85 mol %, for example about 30 mol % to about 70 mol %, about 30 mol % to about 60 mol %, or about 35 mol % to about 55 mol % based on a total amount of the acryl-based heat resistance binder. When the cyano group-containing structural unit is included within the ranges, the acryl-based heat resistance binder and the separator 10 including the same may ensure excellent oxidation resistance and exhibit adherence, heat resistance, and air permeability.

The sulfonate group-containing structural unit may be a structural unit including a conjugate base of a sulfonic acid, a sulfonate salt, a sulfonic acid, or a derivative thereof. For example, the sulfonate group-containing structural unit may be represented by Chemical Formula 5, Chemical Formula 6, Chemical Formula 7 or a combination thereof.

[Chemical Formula 5]

[Chemical Formula 6]

[Chemical Formula 7]

In Chemical Formula 5 to Chemical Formula 7, $R^5$, $R^6$, and $R^7$ are independently hydrogen or a C1 to C3 alkyl group, $L^3$, $L^5$, and $L^7$ are independently —C(=O)—, —C(=O)O—, —OC(=O)—, —O—, or —C(=O)NH—, $L^4$, $L^6$, and $L^8$ are independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, and a, b, c, d, e, and f are independently an integer ranging from 0 to 2, in Chemical Formula 6, M' is an alkali metal.

For example, in Chemical Formula 5 to Chemical Formula 7,

L3, L5, and L7 may independently be —C(=O)NH—,

L4, L6, and L8 may independently be a C1 to C10 alkylene group, and a, b, c, d, e, and f may be an integer of 1.

The sulfonate group-containing structural unit may be for example a structural unit derived from vinyl sulfonic acid, allyl sulfonic acid, styrene sulfonic acid, anethole sulfonic acid, acryl amidoalkane sulfonic acid, sulfoalkyl (meth) acrylate, or a salt thereof.

Herein, the alkane may be C1 to C20 alkane, C1 to C10 alkane, or C1 to C6 alkane and the alkyl may be C1 to C20 alkyl, C1 to C10 alkyl, or C1 to C6 alkyl. The salt refers to a salt consisting of the sulfonic acid and an appropriate ion. The ion may be for example an alkali metal ion and in this case, the salt may be an alkali metal sulfonate salt.

The acryl amidoalkane sulfonic acid may be for example 2-acrylamido-2-methylpropane sulfonic acid and the sulfoalkyl (meth)acrylate may be for example 2-sulfoethyl (meth)acrylate, 3-sulfopropyl (meth)acrylate, and the like.

The sulfonate group-containing structural unit may be included in an amount of about 0.1 mol % to about 20 mol %, for example about 0.1 mol % to about 10 mol %, about 1 mol % to about 20 mol %, or about 1 mol % to about 10 mol % based on a total amount of the acryl-based heat resistance binder. When the sulfonate group-containing structural unit is included within the ranges, the acryl-based heat resistance binder and the separator 10 including the same may exhibit improved adherence, heat resistance, air permeability, and oxidation resistance.

As described above, the acryl-based heat resistance binder may include an alkali metal. The alkali metal may be present in a cation state and may be for example lithium, sodium, potassium, rubidium, or cesium. For example, the alkali metal may be bonded with the acryl-based heat resistance binder and thus may be present in a form of a salt. The alkali metal may help a synthesis of the acryl-based heat resistance binder in an aqueous solvent, improves adherence of the heat resistance layer 30, and also improves heat resistance, air permeability, and oxidation resistance of the separator 10.

The alkali metal may be included in an amount of about 1 wt % to about 40 wt %, for example about 1 wt % to about 30 wt %, or about 1 wt % to about 20 wt %, or about 10 wt % to about 20 wt % based on a total weight of the alkali metal and the acryl-based heat resistance binder. For example, the acryl-based heat resistance binder and the alkali metal may be included in a weight ratio of about 99:1 to about 60:40, for example a weight ratio of about 99:1 to about 70:30, a weight ratio of about 99:1 to about 80:20, or about 90:10 to about 80:20.

The alkali metal may be included in an amount of about 0.1 mol % to about 1.0 mol % based on a total weight of the alkali metal and the acryl-based heat resistance binder.

When the alkali metal is included within the ranges, the heat resistance layer 30 may have improved adherence and the separator 10 including the same may exhibit excellent heat resistance, air permeability, and oxidation resistance.

The acryl-based heat resistance binder may be for example represented by Chemical Formula 8.

[Chemical Formula 8]

In Chemical Formula 8, $R^{11}$ and $R^{12}$ are independently hydrogen or a methyl group, $R^{13}$ and $R^{14}$ are independently hydrogen or a C1 to C3 alkyl group, $L^1$ and $L^5$ are independently —C(=O)—, —C(=O)O—, —OC(=O)—, —O—, or —C(=O)NH—, $L^2$ and $L^6$ are independently a substituted or unsubstituted C1 to C10 alkylene group, a substituted or unsubstituted C3 to C20 cycloalkylene group, a substituted or unsubstituted C6 to C20 arylene group or a substituted or unsubstituted C3 to C20 heterocyclic group, x, y, c, and d are independently an integer ranging from 0 to 2, M is an alkali metal such as lithium, sodium, potassium, rubidium, or cesium, and the like, k, l, m, and n denote a mole ratio of each structural unit. For example, in Chemical Formula 8, $k+l+m+n=1$.

For example, $0.1 \leq (k+l) \leq 0.5$, $0.4 \leq m \leq 0.85$ and $0.001 \leq n \leq 0.2$, for example $0.1 \leq k \leq 0.5$ and $0 \leq l \leq 0.25$.

For example, in Chemical Formula 8, x=y=0, $L^5$ is —C(=O)NH—, $L^6$ is a C1 to C10 alkylene group, and c=d=1.

In the acryl-based heat resistance binder, a substitution degree of the alkali metal ($M^+$) may be about 0.5 to about 1.0, for example about 0.6 to about 0.9, or about 0.7 to about 0.9 relative to (k+n). When the substitution degree of the alkali metal satisfies the ranges, the acryl-based heat resistance binder and the separator 10 including the same may exhibit excellent adherence and heat resistance, and oxidation resistance.

The acryl-based heat resistance binder may further include other structural units in addition to the structural units. For example, the acryl-based heat resistance binder may further include a structural unit derived from alkyl (meth)acrylate, a structural unit derived from a diene-based monomer, a structural unit derived from a styrene-based monomer, an ester group-containing structural unit, a carbonate group-containing structural unit, or a combination thereof.

The acryl-based heat resistance binder may have various forms, that is, an alternate polymer where the structural units are alternately distributed, a random polymer the structural units are randomly distributed, or a graft polymer where a part of structural unit is grafted.

A weight average molecular weight of the acryl-based heat resistance binder may be about 200,000 g/mol to about 700,000 g/mol, for example about 200,000 g/mol to about 600,000 g/mol, or about 300,000 g/mol to about 600,000 g/mol. When the weight average molecular weight of the acryl-based heat resistance binder satisfies the ranges, the acryl-based heat resistance binder and the separator 10 including the same may exhibit excellent adherence, heat resistance, air permeability, and oxidation resistance. The weight average molecular weight may be polystyrene-reduced average molecular weight measured by gel permeation chromatography.

A glass transition temperature of the acryl-based heat resistance binder may be about 200° C. to about 280° C., for example about 210° C. to about 270° C., or about 210° C. to about 260° C. When the glass transition temperature of the acryl-based heat resistance binder satisfies the ranges, the acryl-based heat resistance binder and the separator 10 including the same may exhibit excellent adherence, heat resistance, air permeability, and oxidation resistance. The glass transition temperature is measured by differential scanning calorimetry.

The acryl-based heat resistance binder may be prepared by a solution polymerization method and as described, may be included in the heat resistance layer 30 as a film form.

The water-soluble binder may be dissolved in an aqueous solvent including water, alcohol, or a combination thereof. The water-soluble binder may include at least one functional group selected from a hydroxyl group or a carboxyl group. For example, the water-soluble binder may be a cellulose-based binder. Herein, the cellulose-based binder may be represented by Chemical Formula 9.

[Chemical Formula 9]

In Chemical Formula 9,

R's are independently —OH or R'COOH, and

R' is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group.

More specifically, the cellulose-based binder may be one selected from carboxyl methyl cellulose, hydroxypropyl cellulose, and diacetyl cellulose, or a combination thereof.

In the separator according to an embodiment, the acryl-based heat resistance binder functions to secure heat resistance for reducing a thermal shrinkage rate of the separator at a high temperature, and the water-soluble binder functions to secure a binding force between the heat resistance layer 30 and the porous substrate 20.

Herein, since the heat resistance and the binding force to a substrate have trade-off relationship each other, the acryl-based heat resistance binder is formed into an acryl-based terpolymer, and simultaneously, the binding force to a substrate is secured by the water-soluble binder, and in addition, the acryl-based heat resistance binder and the water-soluble binder are made to coexist in the heat resistance layer 30, and resultantly, the separator according to an embodiment may realize excellent heat resistance and binding force to a substrate.

The water-soluble binder may have a weight average molecular weight ranging from about 50,000 g/mol to about 800,000 g/mol, for example, about 100,000 g/mol to about 600,000 g/mol, or about 200,000 g/mol to 500,000 g/mol. When the water-soluble binder has a weight average molecular weight within the range, the water-soluble binder and the separator 10 including the same may show excellent adherence, heat resistance, air permeability, and oxidation resistance. The weight average molecular weight may be polystyrene-reduced average molecular weight measured by gel permeation chromatography.

In the heat resistance layer, the acryl-based heat resistance binder and the water-soluble binder may be included in a weight ratio of greater than about 0:less than about 10 to less than about 10:greater than about 0, for example, 2:8 to about 8:2, specifically, about 5:5 to about 8:2, and more specifically, about 6:4 to about 8:2. When the acryl-based heat resistance binder and the water-soluble binder are included within the weight ratio, the separator 10 may show excellent heat resistance, adherence, air permeability, oxidation resistance, and the like.

The heat resistance layer 30 may further include a filler in addition to the acryl-based heat resistance binder and the water-soluble binder. Heat resistance may be more improved and abrupt shrinkage or deformation of a separator caused by increase of a temperature may be prevented due to the filler. The filler may be for example an inorganic filler, an organic filler, an organic/inorganic filler, or a combination thereof. The inorganic filler may be a ceramic material capable of improving heat resistance, for example a metal oxide, a semi-metal oxide, a metal fluoride, a metal hydroxide, or a combination thereof. The inorganic filler may be for example $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but is not limited thereto. The organic filler may include an acrylic compound, an imide compound, an amide compound, or a combination thereof, but is not limited thereto. The organic filler may have a core-shell structure, but is not limited thereto.

The filler may have a spherical shape, sheet-shape, cubic-shape, or amorphous shape. An average particle diameter of the filler may range from about 1 nm to about 2500 nm, about nm to about 2000 nm, about 200 nm to about 1000 nm, or about 300 nm to about 800 nm. The average particle diameter of the filler may be particle size ($D_{50}$) at a volume ratio of 50% in a cumulative size-distribution curve. By using the filler having an average particle diameter within the ranges, the heat resistance layer 30 may have an appropriate strength, and the separator 10 may have improved heat resistance, durability, and stability. The filler may be used by mixing two or more different kinds of fillers or two or more fillers having different sizes.

The filler may be included in an amount of about 50 wt % to about 99 wt %, for example about 70 wt % to about 99 wt %, about 75 wt % to about 99 wt %, about 80 wt % to about 99 wt %, about 85 wt % to about 99 wt %, about 90 wt % to about 99 wt %, or about 95 wt % to about 99 wt % based on a total amount of the heat resistance layer 30. When the filler is included within the ranges, the separator 10 for a rechargeable battery according to an embodiment may have improved heat resistance, durability, oxidation resistance, and stability. When the filler is not included within the ranges, a thermal shrinkage rate of the separator 10 may be remarkably decreased.

On the other hand, the heat resistance layer 30 may further include a cross-linkable binder having a cross-linking structure in addition to the acryl-based heat resistance binder and the water-soluble binder. The cross-linkable binder may be obtained from a monomer, an oligomer, and/or a polymer having a curable functional group capable of reacting with heat and/or light, for example, a multi-functional monomer, a multi-functional oligomer, and/or a multi-functional polymer having at least two curable functional groups. The curable functional group may include a vinyl group, a (meth)acrylate group, an epoxy group, an oxetane group, an ether group, a cyanate group, an isocyanate group, a hydroxy group, a carboxyl group, a thiol group, an amino group, an alkoxy group, or a combination thereof, but is not limited thereto.

The cross-linkable binder may be obtained from a monomer, an oligomer and/or a polymer including at least two (meth)acrylate groups, for example ethylene glycol di(meth)acrylate, propylene glycol di(meth)acrylate, polyethylene glycol di(meth)acrylate, polypropylene glycol di(meth)acrylate, butanediol di(meth)acrylate, hexamethylene glycol di(meth)acrylate, trimethylolpropane tri(meth)acrylate, glycerine tri(meth)acrylate, pentaerythritol tetra(meth)acrylate, diglycerine hexa(meth)acrylate, or a combination thereof.

For example, the cross-linkable binder may be obtained from a monomer, an oligomer and/or a polymer including at least two epoxy groups, for example bisphenol A diglycidyl ether, bisphenol F diglycidyl ether, hexahydrophthalic acid glycidyl ester, or a combination thereof.

For example, the cross-linkable binder may be obtained from a monomer, an oligomer and/or a polymer including at least two isocyanate groups, for example diphenylmethane diisocyanate, 1,6-hexamethylene diisocyanate, 2,2,4(2,2,4)-trimethyl hexamethylene diisocyanate, phenylene diisocyanate, 4,4'-dicyclohexylmethane diisocyanate, 3,3'-dimethyl-diphenyl-4,4'-diisocyanate, xylene diisocyanate, naphthalene diisocyanate, 1,4-cyclohexyl diisocyanate, or a combination thereof.

In addition, the heat resistance layer 30 may further include a non-cross-linkable binder in addition to the acryl-based heat resistance binder and the water-soluble binder. The non-cross-linkable binder may be for example a vinylidene fluoride-based polymer, polymethylmethacrylate, polyacrylonitrile, polyvinylpyrrolidone, polyvinylacetate, a polyethylene-vinylacetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxylmethyl cellulose, an acrylonitrile-styrene-butadiene copolymer, or a combination thereof, but is not limited thereto.

The vinylidene fluoride-based polymer may be specifically a homopolymer including only vinylidene fluoride monomer-derived structural unit or a copolymer of a vinylidene fluoride-derived structural unit and other monomer-derived structural unit. The copolymer may specifically include a vinylidene fluoride-derived structural unit and at least one of structural units derived from chlorotrifluoroethylene, trifluoroethylene, hexafluoropropylene, ethylene tetrafluoride and ethylene monomers, but is not limited thereto. For example, the copolymer may be a polyvinylidene fluoride-hexafluoropropylene (PVdF-HFP) copolymer including a vinylidene fluoride monomer-derived structural unit and a hexafluoropropylene monomer-derived structural unit.

For example, the non-cross-linkable binder may be a polyvinylidene fluoride (PVdF) homopolymer, a polyvinylidene fluoride-hexafluoropropylene (PVdF-HFP) copolymer, or a combination thereof. In this case, adherence between the porous substrate 20 and the heat resistance layer 30 is increased, stability of the separator 10 and impregnation properties of an electrolyte solution are improved, and thus high-rate charge and discharge characteristics of a battery is improved.

The heat resistance layer 30 may have a thickness of about 0.01 µm to 20 µm, for example about 1 µm to about 10 µm, about 1 µm to about 5 µm, or about 1 µm to about 3 µm.

A ratio of a thickness of the heat resistance layer 30 relative to a thickness of the porous substrate 20 may be about 0.05 to about 0.5, for example about 0.05 to about 0.4, or about 0.05 to about 0.3, or about 0.1 to about 0.2. When the ratio of the thicknesses of the porous substrate 20 and the heat resistance layer 30 is within the ranges, the separator 10 including the same may exhibit excellent air permeability, heat resistance, and adherence.

The separator 10 for a rechargeable battery according to an embodiment has excellent heat resistance. Specifically, the separator 10 may have a thermal shrinkage rate of less than or equal to about 30%, for example less than or equal to about 10%. For example, after the separator 10 is allowed to stand at about 150° C. for about 60 minutes, each shrinkage rate of the separator 10 may be less than or equal to about 30% or less than or equal to about 10% in a machine direction (MD) and in a traverse direction (TD).

In general, in the separator 10, when the heat resistance layer 30 is thick, a thermal shrinkage rate at a high temperature may be lowered. However, the separator 10 according to an embodiment may realize a shrinkage rate at a high temperature of less than or equal to about 30%, for example less than or equal to about 10% even if a thickness of the heat resistance layer 30 is about 1 µm to about 5 µm, or about 1 µm to about 3 µm.

In addition, the separator 10 for a rechargeable battery according to an embodiment is not broken or deformed and its shape is stably maintained at a high temperature of greater than or equal to about 200° C., for example about 200° C. to about 250° C.

The separator 10 for a rechargeable battery according to an embodiment may have excellent adherence to a substrate. Specifically, the separator 10 may have peeling strength of greater than or equal to about 0.50 gf/mm, for example, about 0.3 gf/mm to about 1.50 gf/mm, or about 0.50 gf/mm to about 1.20 gf/mm. For example, after passing the separator 10 between rolls having a pressure of about 250 kgf at a speed of about 150 mm/sec in an about 80° C. chamber, the separator for a rechargeable battery may have peeling strength of greater than or equal to about 0.50 gf/mm, for example, about 0.30 gf/mm to about 1.50 gf/mm, or about 0.5 gf/mm to about 1.20 gf/mm.

The separator 10 for a rechargeable battery according to an embodiment may exhibit excellent air permeability, and specifically less than about 200 sec/100 cc, for example less than or equal to about 190 sec/100 cc or less than or equal to about 180 sec/100 cc. In other words, the separator may have air permeability of less than about 40 sec/100 cc·1 µm, for example, less than or equal to about 30 sec/100 cc·1 µm, or less than or equal to about 25 sec/100 cc·1 µm per a unit thickness. Herein, the air permeability refers to a time (second) until the separator passes cc of air. The air permeability per a unit thickness may be obtained by measuring air permeability about an entire thickness of the separator and dividing the air permeability by a thickness.

The separator 10 for a rechargeable battery according to an embodiment may be manufactured by known various methods. For example, the separator 10 for a rechargeable battery may be manufactured by coating a composition for forming a heat resistance layer on one surface or both surfaces of the porous substrate 20 and drying it to form the heat resistance layer 30 and then, coating a composition for forming a coating layer on one surface of the heat resistance layer 30 and drying it to form the coating layer 32.

The composition for forming a heat resistance layer includes the acryl-based heat resistance binder and filler and a solvent and may be a copolymer including a repeating unit derived from the acrylate monomer. The solvent is not particularly limited if the solvent may dissolve or disperse the acryl-based heat resistance binder and the filler. In an embodiment, the solvent may be an aqueous solvent including water, an alcohol, or a combination thereof, which is environmentally-friendly.

The coating may be, for example, spin coating, dip coating, bar coating, die coating, slit coating, roll coating, inkjet printing, and the like, but is not limited thereto.

The drying may be for example performed through natural drying, drying with warm air, hot air, or low humid air, vacuum-drying, or radiation of a far-infrared ray, an electron beam, and the like, but the present disclosure is not limited thereto. The drying may be for example performed at a temperature of about 25° C. to about 120° C.

The separator 10 for a rechargeable battery may be manufactured by lamination, coextrusion, and the like in addition to the above method.

Hereinafter, a rechargeable lithium battery including the separator 10 for a rechargeable battery is described.

A rechargeable lithium battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shape. In addition, it may be bulk type and thin film type depending on sizes. Structures and manufacturing methods for lithium ion batteries pertaining to this disclosure are well known in the art.

Figure 2:
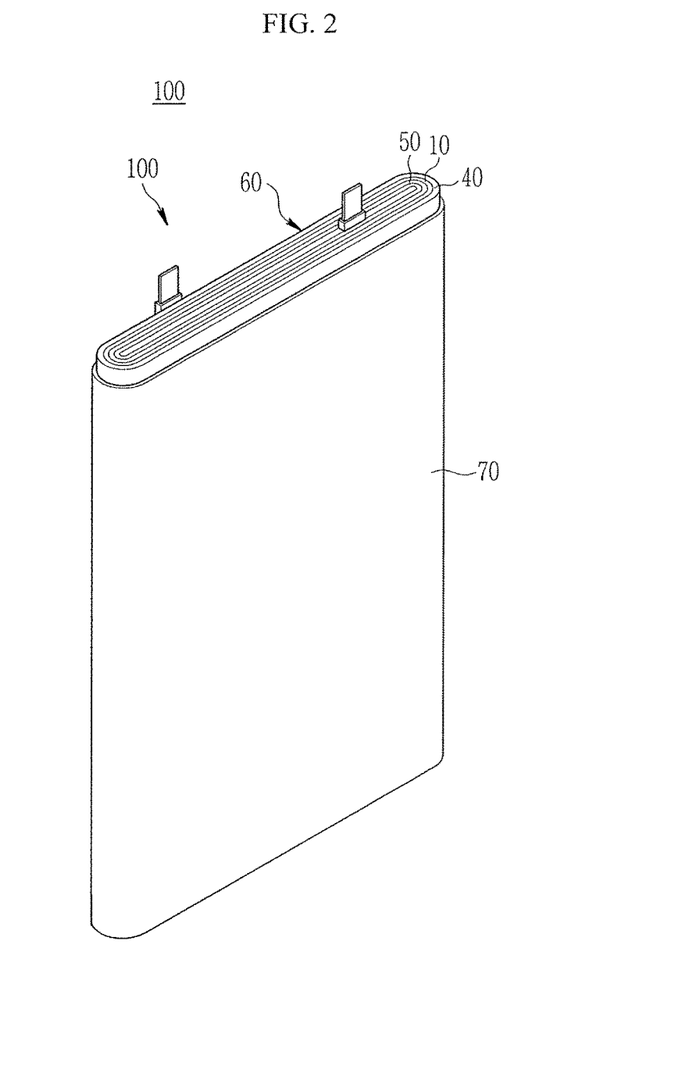
FIG. 2 is an exploded perspective view showing a rechargeable lithium battery according to an embodiment.

Herein, as an example of a rechargeable lithium battery, a prismatic rechargeable lithium battery is for example described. FIG. 2 is an exploded perspective view showing a rechargeable lithium battery according to an embodiment. Referring to FIG. 2, a rechargeable lithium battery 100 according to one embodiment includes an electrode assembly 60 manufactured by interposing a separator 10 between a positive electrode 40 and a negative electrode 50 and winding them, and a case 70 housing the electrode assembly 60.

The electrode assembly 60 may have for example a jelly-roll shape formed by winding the positive electrode 40, the negative electrode 50, and the separator 10 disposed therebetween.

The positive electrode 40, the negative electrode 50, and the separator 10 are impregnated in an electrolyte solution (not shown).

The positive electrode 40 includes a positive current collector and a positive active material layer formed on the positive current collector. The positive active material layer includes a positive active material, a binder, and optionally a conductive material.

The positive current collector may use aluminum, nickel, and the like, but is not limited thereto.

The positive active material may use a compound being capable of intercalating and deintercalating lithium. Specifically, at least one of a composite oxide or a composite phosphate of a metal selected from cobalt, manganese, nickel, aluminum, iron, or a combination thereof and lithium may be used. For example, the positive active material may be a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

The binder improves binding properties of positive active material particles with one another and with a current collector, and specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material improves conductivity of an electrode. Examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 50 includes a negative current collector and a negative active material layer formed on the negative current collector.

The negative current collector may use copper, gold, nickel, a copper alloy, and the like, but is not limited thereto.

The negative active material layer may include a negative active material, a binder, and optionally a conductive material. The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be may be graphite such as amorphous, sheet-shape, flake, spherical shape or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si—Y alloy, Sn, $SnO_2$, a Sn—C composite, a Sn—Y alloy, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and the like.

The binder and the conductive material used in the negative electrode 50 may be the same as the binder and conductive material of the positive electrode 40.

The positive electrode 40 and the negative electrode 50 may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte solution includes an organic solvent a lithium salt.

The organic solvent serves as a medium for transmitting ions taking part in the electrochemical reaction of a battery. Specific examples thereof may be selected from a carbonate-based solvent, an ester-based solvent, an ether-based solvent, a ketone-based solvent, an alcohol-based solvent, and an aprotic solvent.

The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, and the like, and the ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like.

The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like.

The alcohol-based solvent may be ethanol, isopropyl alcohol, and the like, and the aprotic solvent may be nitriles such as R—CN (R is a C2 to C20 linear or branched or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the rechargeable lithium battery, and improves lithium ion transportation between positive and negative electrodes therein. Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)$ $(C_yF_{2y'+1}SO_2)$ (x' and y' are natural numbers), LiCl, LiI, $LiB(C_2O_4)_2$, or a combination thereof, but is not limited thereto.

The lithium salt may be used in a concentration ranging from about 0.1 M to about 2.0 M. When the lithium salt is included within the concentration range, an electrolyte may have excellent performance and lithium ion mobility due to optimal electrolyte conductivity and viscosity.

Hereinafter, the above aspects of the present disclosure are illustrated in more detail with reference to examples. However, these examples are exemplary, and the present disclosure is not limited thereto.

Synthesis Example 1: Preparation of Acryl-Based Heat Resistance Binder

Synthesis Example 1-1

Distilled water (968 g), acrylic acid (45.00 g, 0.62 mol), ammonium persulfate (0.54 g, 2.39 mmol, 1500 ppm based on monomers), 2-acrylamido-2-methylpropane sulfonic acid (5.00 g, 0.02 mol), and a 5 N sodium hydroxide aqueous solution (0.8 equivalent based on a total amount of the acrylic acid and the 2-acrylamido-2-methylpropane sulfonic acid) were put in a 3 L four-necked flask equipped with a stirrer, a thermometer, and a condenser, and after three times repetitively reducing an internal pressure in the flask into 10 mmHg with a diaphragm pump and recovering it into a normal pressure with nitrogen, acrylonitrile (50.00 g, 0.94 mol) was added thereto.

The reaction solution was controlled to have a stable temperature in a range of 65° C. to 70° C. and reacted for 18 hours, ammonium persulfate (0.23 g, 1.00 mmol, 630 ppm based on a monomer) was secondarily added thereto, and the obtained mixture was heated up to 80° C. and reacted again for 4 hours. After cooling the temperature down to room temperature, the reaction solution was adjusted to have pH in a range of 7 to 8 by using a 25% ammonia aqueous solution.

A poly(acrylic acid-co-acrylonitrile-co-2-acrylamido-2-methylpropane sulfonic acid) sodium salt was prepared in this method. The acrylic acid, the acrylonitrile, and the 2-acrylamido-2-methylpropane sulfonic acid were used in a mole ratio of 39:59:2. About 10 mL of the reaction solution (a reaction product) was taken to measure a non-volatile component, and the result was 9.0 wt % (a theoretical value: 10%).

Synthesis Example 1-2

An acryl-based copolymer was manufactured according to the same method as Synthesis Example 1-1 except for using acrylic acid (40 g, 0.56 mol), acrylonitrile (50 g, 0.94 mol), and 2-acrylamido-2-methylpropane sulfonic acid (10 g, 0.05 mol). The acrylic acid, the acrylonitrile, and the 2-acrylamido-2-methylpropane sulfonic acid were used in a mole ratio of 36:61:3. The reaction solution included a non-volatile component of 9.0 wt % (a theoretical value: 10%).

Synthesis Example 1-3

An acryl-based copolymer was manufactured according to the same method as Synthesis Example 1-1 except for using acrylic acid (35 g, 0.49 mol), acrylo nitrile (50 g, 0.94 mol), and 2-acrylamido-2-methylpropane sulfonic acid (15 g, 0.07 mol). The acrylic acid, the acrylonitrile, and the 2-acrylamido-2-methylpropane sulfonic acid were used in a mole ratio of 32:63:5. The reaction solution included a non-volatile component of 9.0 wt % (a theoretical value: 10%).

Synthesis Example 1-4

An acryl-based copolymer was manufactured according to the same method as Synthesis Example 1-1 except for using acrylic acid (30 g, 0.42 mol), acrylonitrile (50 g, 0.94 mol), and 2-acrylamido-2-methylpropane sulfonic acid (20 g, 0.10 mol). The acrylic acid, the acrylonitrile, and the 2-acrylamido-2-methylpropane sulfonic acid were used in a mole ratio of 28:65:7. The reaction solution included a non-volatile component of 9.0 wt % (a theoretical value: 10%).

Synthesis Example 1-5

An acryl-based copolymer was manufactured according to the same method as Synthesis Example 1-1 except for using acrylic acid (32 g, 0.49 mol), acrylonitrile (60 g, 1.13 mol), and 2-acrylamido-2-methylpropane sulfonic acid (5 g, 0.02 mol). The acrylic acid, the acrylonitrile, and the 2-acrylamido-2-methylpropane sulfonic acid were used in a mole ratio of 30:69:1. The reaction solution included a non-volatile component of 9.0 wt % (a theoretical value: 10%).

Synthesis Example 1-6

An acryl-based copolymer was manufactured according to the same method as Synthesis Example 1-1 except for using acrylic acid (30 g, 0.42 mol), acrylonitrile (60 g, 1.13 mol), and 2-acrylamido-2-methylpropane sulfonic acid (10 g, 0.05 mol). The acrylic acid, the acrylonitrile, and the 2-acrylamido-2-methylpropane sulfonic acid were used in a mole ratio of 26:71:3. The reaction solution included a non-volatile component of 9.0 wt % (a theoretical value: 10%).

Synthesis Example 1-7

An acryl-based copolymer was manufactured according to the same method as Synthesis Example 1-1 except for using acrylic acid (25 g, 0.35 mol), acrylonitrile (60 g, 1.13 mol), and 2-acrylamido-2-methylpropane sulfonic acid (15 g, 0.07 mol). The acrylic acid, the acrylonitrile, and the 2-acrylamido-2-methylpropane sulfonic acid were used in a mole ratio of 22:73:5. The reaction solution included a non-volatile component of 9.0 wt % (a theoretical value: 10%).

Synthesis Example 1-8

An acryl-based copolymer was manufactured according to the same method as Synthesis Example 1-1 except for using acrylic acid (20 g, 0.28 mol), acrylonitrile (60 g, 1.13 mol), and 2-acrylamido-2-methylpropane sulfonic acid (20 g, 0.10 mol). The acrylic acid, the acrylonitrile, and the 2-acrylamido-2-methylpropane sulfonic acid were used in a mole ratio of 18:75:7. The reaction solution included a non-volatile component of 9.0 wt % (a theoretical value: 10%).

Comparative Synthesis Example 1

An acryl-based copolymer was manufactured according to the same method as Synthesis Example 1-1 except for using acrylic acid (50 g, 0.69 mol) and acrylonitrile (50 g, 0.94 mol) but not using 2-acrylamido-2-methylpropane sulfonic acid. The acrylic acid and the acrylonitrile were used in a mole ratio of 42:58. The reaction solution included a non-volatile component of 9.0 wt % (a theoretical value: 10%).

Comparative Synthesis Example 2

An acryl-based copolymer was manufactured according to the same method as Synthesis Example 1-1 except for using acrylic acid (50 g, 0.69 mol) and 2-acrylamido-2-methylpropane sulfonic acid (50 g, 0.24 mol) but not using acrylonitrile. The acrylic acid and the acrylamido-2-methylpropane sulfonic acid were used in a mole ratio of 74:26. The reaction solution included a non-volatile component of 9.0 wt % (a theoretical value: 10%).

Table 1 shows mole ratios, weight average molecular weights, and glass transition temperatures of monomers of each acryl-based copolymer according to Synthesis Example 1-1 to Synthesis Example 1-8 and Comparative Synthesis Example 1-1 to Comparative Synthesis Example 1-2.

TABLE 1

|  | Mole ratio of monomers | | | Weight average molecular weight | Glass transition temperature |
| --- | --- | --- | --- | --- | --- |
|  | AA | AN | AMPS | (g/mol) | (° C.) |
| Synthesis Example 1-1 | 39 | 59 | 2 | 310,000 | 280 |
| Synthesis Example 1-2 | 36 | 61 | 3 | 302,000 | 277 |
| Synthesis Example 1-3 | 32 | 63 | 5 | 304,000 | 275 |
| Synthesis Example 1-4 | 28 | 65 | 7 | 311,000 | 271 |
| Synthesis Example 1-5 | 30 | 69 | 1 | 285,000 | 265 |
| Synthesis Example 1-6 | 26 | 71 | 3 | 298,000 | 263 |
| Synthesis Example 1-7 | 22 | 73 | 5 | 305,000 | 232 |
| Synthesis Example 1-8 | 18 | 75 | 7 | 314,000 | 260 |
| Comparative Synthesis Example 1 | 42 | 58 | — | 320,000 | 278 |
| Comparative Synthesis Example 2 | 74 | — | 26 | 293,000 | 305 |

In Table 1, AA indicates acrylic acid, AN indicates acrylonitrile, and AMPS indicates 2-acrylamido-2-methyl-propane sulfonic acid. The glass transition temperature was measured through a differential scanning calorimetry analysis.

Examples: Manufacture of Separator for Rechargeable Battery

Example 1

A mixture of the acryl-based polymer (10 wt % in distilled water) according to Synthesis Example 1-1, a carboxylmethyl cellulose binder (Sigma-Aldrich Corporation, weight average molecular weight of about 250,000, melting point of 260° C., and 0.5 wt % in distilled water) in a weight ratio of 5:5, and boehmite (average particle diameter of 600 nm, AOH60, Nabaltec AG) in a mass ratio of 1:30 were mixed with a water solvent and then, milled therewith at 25° C. for 30 minutes with a bead mill, and water was added thereto until a total solid content became 20 wt % to prepare a composition for forming a heat resistance layer. The composition for forming a heat resistance layer was die-coated to be 3 μm thick to be on the cross section of a 12.5 μm-thick polyethylene porous substrate (permeability: 111 sec/100 cc, puncture strength: 360 kgf, SK) and then, dried at 70° C. for 10 minutes to manufacture a separator for a rechargeable battery.

Example 2

A separator for a rechargeable battery was manufactured according to the same method as Example 1 except that the acryl-based heat resistance binder prepared in Synthesis Example 1-1 (10 wt % in distilled water) and a carboxylmethyl cellulose binder (Sigma-Aldrich Corporation, weight average molecular weight of about 250,000, melting point of 260° C., and 0.5 wt % in distilled water) were added in a weight ratio of 3:7.

Example 3

A separator for a rechargeable battery was manufactured according to the same method as Example 1 except that the acryl-based heat resistance binder prepared in Synthesis Example 1-1 (10 wt % in distilled water) and a carboxylmethyl cellulose binder (Sigma-Aldrich Corporation, weight average molecular weight of about 250,000, melting point of 260° C., and 0.5 wt % in distilled water) were added in a weight ratio of 7:3.

Example 4

A separator for a rechargeable battery was manufactured according to the same method as Example 3 except for using the acryl-based polymer of Synthesis Example 1-2 instead of the acryl-based polymer of Synthesis Example 1-1.

Example 5

A separator for a rechargeable battery was manufactured according to the same method as Example 3 except for using the acryl-based polymer of Synthesis Example 1-3 instead of the acryl-based polymer of Synthesis Example 1-1.

Example 6

A separator for a rechargeable battery was manufactured according to the same method as Example 3 except for using the acryl-based polymer of Synthesis Example 1-4 instead of the acryl-based polymer of Synthesis Example 1-1.

Example 7

A separator for a rechargeable battery was manufactured according to the same method as Example 3 except for using the acryl-based polymer of Synthesis Example 1-5 instead of the acryl-based polymer of Synthesis Example 1-1.

Example 8

A separator for a rechargeable battery was manufactured according to the same method as Example 3 except for using the acryl-based polymer of Synthesis Example 1-6 instead of the acryl-based polymer of Synthesis Example 1-1.

Example 9

A separator for a rechargeable battery was manufactured according to the same method as Example 3 except for using the acryl-based polymer of Synthesis Example 1-7 instead of the acryl-based polymer of Synthesis Example 1-1.

Example 10

A separator for a rechargeable battery was manufactured according to the same method as Example 3 except for using the acryl-based polymer of Synthesis Example 1-8 instead of the acryl-based polymer of Synthesis Example 1-1.

Comparative Example 1

A separator for a rechargeable battery was manufactured according to the same method as Example 1, except that the acryl-based heat resistance binder prepared in Synthesis Example 1-1 (10 wt % in distilled water) and a carboxylmethyl cellulose binder (Sigma-Aldrich Corporation, weight average molecular weight of about 250,000, melting point of 260° C., and 0.5 wt % in distilled water) were added in a weight ratio of 10:0.

Comparative Example 2

A separator for a rechargeable battery was manufactured according to the same method as Example 1, except that the acryl-based heat resistance binder prepared in Synthesis Example 1-1 (10 wt % in distilled water) and a carboxylmethyl cellulose binder (Sigma-Aldrich Corporation, weight average molecular weight of about 250,000, melting point of 260° C., and 0.5 wt % in distilled water) were added in a weight ratio of 0:10.

Comparative Example 3

A separator for a rechargeable battery was manufactured according to the same method as Example 3 except for using the acryl-based polymer of Comparative Synthesis Example 1-1 instead of the acryl-based polymer of Synthesis Example 1-1.

Comparative Example 4

A separator for a rechargeable battery was manufactured according to the same method as Example 3 except for using the acryl-based polymer of Comparative Synthesis Example 1-2 instead of the acryl-based polymer of Synthesis Example 1-1.

Evaluation Method

Evaluation Example 1: Air Permeability

Each time (seconds) until the separators for a rechargeable battery according to Examples 1 to 10 and Comparative Examples 1 to 4 passed 100 cc of air was measured by using a permeability measuring device (EG01-55-1MR, Asahi Seiko Co., Ltd.), and the results are shown in Table 2.

Evaluation Example 2: Adhesion Force to Substrate

The separators according to Examples and Comparative Examples were respectively cut into a size having a width of 25 mm and a length of 50 mm to prepare each sample. After adhering a tape to the heat-resisting layer surface of each sample, separating the tape-adhered surface from the substrate about 10 mm to 20 mm apart, and then, clipping the substrate having no tape with an upper grip, the heat-resisting layer surface adhered with the tape with a lower grip, and fixing a distance between the grips into 20 mm, the heat-resisting layer was pulled toward a direction of 180° and peeled off from the separator. Herein, strength for peeling off the heat-resisting layer up to 40 mm at a peeling speed of 20 mm/min was three times measured and averaged. The peeling strength results are shown in Table 2.

Evaluation Example 3: Thermal Shrinkage Rate

The separators for a rechargeable battery according to Examples 1 to 10 and Comparative Examples 1 to 4 were respectively cut into a size of 8 cm×8 cm to prepare samples. The samples after drawing a 5 cm×5 cm-size quadrangle on the surface were inserted between paper or alumina powder, allowed to stand at 150° C. in an oven for 1 hour, and taken out of the oven, and each shrinkage rate between machine direction (MD) and in a traverse direction (TD) was calculated by measuring sides of the quadrangles drawn on the samples. The results are shown in Table 2.

Evaluation Example 4: Heat-Resistant Fracture

The separators for a rechargeable battery according to Examples 1 to 10 and Comparative Examples 1 to 4 were respectively cut into a size of 5 cm×5 cm, and were respectively attached on a cardboard having a 4 cm×4 cm-sized hole in the center by using a polyimide film and put in each oven heated up to 200° C., 230° C., and 250° C.

The separators were taken out of the ovens after 10 minutes to examine whether or not the separators were fractured. When fractured, O was given, but when not fractured, X was given. The results are shown in Table 2.

TABLE 2

| Mole ratio of each monomer of acryl-based copolymer | | | Acryl-based heat resistance binder:water-soluble binder ratio | Solid content of composition for forming a heat resistance layer (wt %) | Mass ratio of acryl-based copolymer and boehmite | Thickness of heat resistance layer (μm) | Air permeability of separator (sec/100 cc) | Adhesion force to substrate (gf/mm) | Thermal shrinkage rate of separator (%) (MD; TD) | Heat resistant fracture | | |
|---|---|---|---|---|---|---|---|---|---|---|---|---|
| AA | AN | AMPS | | | | | | | | 200° C. | 230° C. | 250° C. |
| Ex. 1 | 39 | 59 | 2 | 5:5 | 20 | 1:30 | 3 | 140 | 0.96 | 2; 2 | X | X | X |
| Ex. 2 | 39 | 59 | 2 | 3:7 | 20 | 1:30 | 3 | 162 | 1.03 | 2; 2 | X | X | X |
| Ex. 3 | 39 | 59 | 2 | 7:3 | 20 | 1:30 | 3 | 135 | 1.15 | 2; 2 | X | X | X |
| Ex. 4 | 36 | 61 | 3 | 7:3 | 20 | 1:30 | 3 | 151 | 1.23 | 4; 3 | X | X | X |
| Ex. 5 | 32 | 63 | 5 | 7:3 | 20 | 1:30 | 3 | 137 | 1.15 | 4; 3 | X | X | X |
| Ex. 6 | 28 | 65 | 7 | 7:3 | 20 | 1:30 | 3 | 143 | 1.13 | 4; 3 | X | X | X |
| Ex. 7 | 30 | 69 | 1 | 7:3 | 20 | 1:30 | 3 | 142 | 1.06 | 4; 3 | X | X | X |
| Ex. 8 | 26 | 71 | 3 | 7:3 | 20 | 1:30 | 3 | 152 | 1.03 | 4; 3 | X | X | X |
| Ex. 9 | 22 | 73 | 5 | 7:3 | 20 | 1:30 | 3 | 143 | 0.98 | 4; 3 | X | X | X |
| Ex. 10 | 18 | 75 | 7 | 7:3 | 20 | 1:30 | 3 | 138 | 0.89 | 4; 3 | X | X | X |
| Comp. Ex. 1 | 39 | 59 | 2 | 10:0 | 20 | 1:30 | 3 | 130 | 0.52 | 4; 3 | X | X | X |
| Comp. Ex. 2 | 39 | 59 | 2 | 0:10 | 20 | 1:30 | 3 | 180 | 1.51 | 5; 3 | O | O | O |
| Comp. Ex. 3 | 42 | 58 | — | 7:3 | 20 | 1:30 | 3 | 141 | 0.56 | 10; 14 | X | O | O |

TABLE 2-continued

| | Mole ratio of each monomer of acryl-based copolymer | | | Acryl-based heat resistance binder:water-soluble binder ratio | Solid content of composition for forming a heat resistance layer (wt %) | Mass ratio of acryl-based copolymer and boehmite | Thickness of heat resistance layer (μm) | Air permeability of separator (sec/100 cc) | Adhesion force to substrate (gf/mm) | Thermal shrinkage rate of separator (%) (MD; TD) | Heat resistant fracture | | |
|---|---|---|---|---|---|---|---|---|---|---|---|---|---|
| | AA | AN | AMPS | | | | | | | | 200° C. | 230° C. | 250° C. |
| Comp. Ex. 4 | 74 | — | 26 | 7:3 | 20 | 1:30 | 3 | 158 | 0.64 | 15; 13 | ○ | ○ | ○ |

Referring to Table 2, the separators according to Examples showed excellent air permeability and in addition, a small shrinkage rate and simultaneously, no heat resistant fracture and thus, realized excellent heat resistance and thermal stability.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: separator
20: porous substrate
30: heat resistance layer
40: positive electrode
50: negative electrode
60: electrode assembly
70: case

What is claimed is:

1. A separator for a rechargeable battery comprising a porous substrate and a heat resistance layer on at least one surface of the porous substrate, wherein the heat resistance layer includes an acryl-based heat resistance binder, a water-soluble binder, and a filler, and
the acryl-based heat resistance binder includes a structural unit derived from (meth)acrylate or (meth)acrylic acid, a cyano group-containing structural unit, and a sulfonate group-containing structural unit, and
wherein the structural unit derived from (meth)acrylic acid is included in the acryl-based heat resistance binder in an amount of about 20 mol % to about 60 mol %,
the cyano group-containing structural unit is included in the acryl-based heat resistance binder in an amount of about 30 mol % to about 70 mol %, and
the sulfonate group-containing structural unit is included in the acryl-based heat resistance binder in an amount of about 0.1 mol % to about 20 mol %.

2. The separator for a rechargeable battery of claim 1, wherein the water-soluble binder is a binder including at least one functional group selected from a hydroxyl group or a carboxyl group.

3. The separator for a rechargeable battery of claim 1, wherein the a structural unit derived from (meth)acrylic acid includes one or more moieties represented by Chemical Formula 1, Chemical Formula 2, and Chemical Formula 3:

[Chemical Formula 1]

[Chemical Formula 2]

[Chemical Formula 3]

wherein, in Chemical Formula 1 to Chemical Formula 3,
$R^1$, $R^2$ and $R^3$ are independently hydrogen or a methyl group, and
in Chemical Formula 2,
M is an alkali metal.

4. The separator for a rechargeable battery of claim 1, wherein the cyano group-containing structural unit is a moiety represented by Chemical Formula 4:

[Chemical Formula 4]

wherein, in Chemical Formula 4,
$R^4$ is hydrogen or a C1 to C3 alkyl group, $L^1$ is —C(=O)—, —C(=O)O—, —OC(=O)—, —O—, or —C(=O)NH—,
x is an integer 0 to 2,
$L^2$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, and
y is an integer ranging from 0 to 2.

5. The separator for a rechargeable battery of claim 1, wherein the sulfonate group-containing structural unit includes one or more moieties represented by Chemical Formula 5, Chemical Formula 6, and Chemical Formula 7:

[Chemical Formula 5]

[Chemical Formula 6]

[Chemical Formula 7]

wherein, in Chemical Formula 5 to Chemical Formula 7,
$R^5$, $R^6$, and $R^7$ are independently hydrogen or a C1 to C3 alkyl group,
$L^3$, $L^5$, and $L^7$ are independently —C(=O)—, —C(=O)O—, —OC(=O)—, —O—, or —C(=O)NH—,
$L^4$, $L^6$, and $L^8$ are independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, and
a, b, c, d, e, and f are independently an integer ranging from 0 to 2,
in Chemical Formula 6,
M' is an alkali metal.

6. The separator for a rechargeable battery of claim 1, wherein a weight average molecular weight of the acryl-based heat resistance binder ranges from 200,000 g/mol to 700,000 g/mol.

7. The separator for a rechargeable battery of claim 1, wherein a glass transition temperature of the acryl-based heat resistance binder ranges from 200° C. to 280° C.

8. The separator for a rechargeable battery of claim 1, wherein the aryl-based heat resistance binder includes an alkali metal.

9. The separator for a rechargeable battery of claim 1, wherein the acryl-based heat resistance binder and the water-soluble binder are included in a weight ratio of 2:8 to 8:2.

10. The separator for a rechargeable battery of claim 1, wherein the water-soluble binder is a cellulose-based binder.

11. The separator for a rechargeable battery of claim 10, wherein the cellulose-based binder is represented by Chemical Formula 9,

[Chemical Formula 9]

wherein, in Chemical Formula 9,
R's are independently —OH or R'COOH, and
R' is a substituted or unsubstituted C1 to C10 alkylene group, a substituted or unsubstituted C3 to C20 cycloalkylene group, a substituted or unsubstituted C6 to C20 arylene group or a substituted or unsubstituted C3 to C20 heterocyclic group.

12. The separator for a rechargeable battery of claim 11, wherein the cellulose-based binder is selected from carboxyl methyl cellulose, hydroxypropyl cellulose, and diacetyl cellulose, or a combination thereof.

13. The separator for a rechargeable battery of claim 1, wherein a weight average molecular weight of the water-soluble binder ranges from 50,000 g/mol to 800,000 g/mol.

14. A rechargeable lithium battery comprising
a positive electrode,
a negative electrode, and
the separator of claim 1 disposed between the positive electrode and the negative electrode.

* * * * *